UNITED STATES PATENT OFFICE.

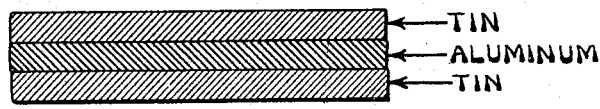
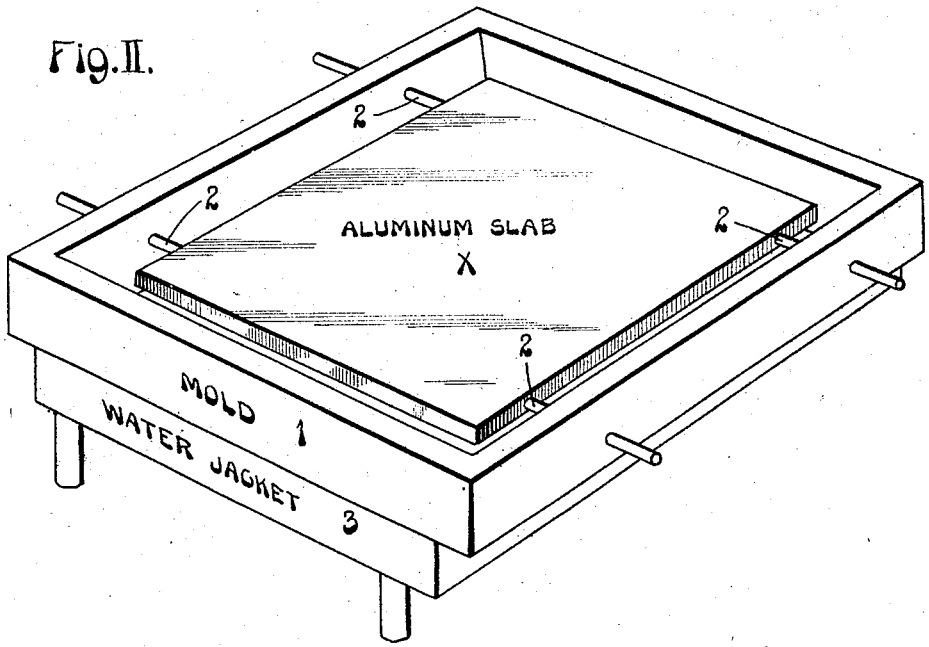

LEWIS B. TEBBETTS, 2d, OF ST. LOUIS, MISSOURI.

COMPOSITE METAL.

1,101,220.

Specification of Letters Patent.   Patented June 23, 1914.

Application filed September 23, 1912.   Serial No. 721,821.

*To all whom it may concern:*

Be it known that I, LEWIS B. TEBBETTS, 2d., a citizen of the United States of America, and a resident of the city of St. Louis and State of Missouri, have invented certain new and useful Improvements in Composite Metals, of which the following is a full, clear, and exact description, reference being had to the accompanying drawings, forming a part of this specification.

My invention relates to a composite metal made up of a plurality of layers of metals having different characteristics, and it has for its object the production of a composite metal having qualities in some respects similar to sheet tin, or tin coated sheet iron, but which is lighter in weight, less expensive to manufacture, is non-corrosive, and is of a higher degree of inherent stiffness than sheet tin alone, and a product much more desirable for use in the arts than either sheet tin or tin coated sheet iron.

Figure I is a cross section illustrating my composite sheet metal. Fig. II is a perspective view, showing the mold utilized in producing ingots of my composite metal.

My composite metal includes two outer layers of tin and an intermediate layer of aluminum, the latter being either pure aluminum, or an alloy of aluminum and not over one and one-half per cent. of manganese or an alloy of aluminum and not over two per cent. of copper.

As is well known, tin is a metal very valuable for use in the arts; but lacking stiffness and rigidity, it cannot be satisfactorily employed in numerous instances by reason of its deficiency in the qualities mentioned, and it has heretofore been one of the commonest practices to supply the desired stiffness and rigidity in the use of tin by using only a thin coating of the latter upon sheet iron. A tin coated iron product is a very unsatisfactory product, owing to the iron being corrosive, by reason of which fact the product becomes deteriorated, in consequence of a slight encroachment of moisture beneath the surfacing of tin. My composite metal comprising tin and aluminum, both of which are non-corrosive, is, therefore, a much more desirable one than an iron coated product, and is also a composite metal much more ductile than a product comprising iron coated with tin.

To produce a commercial composite metal made up of individual layers, including an inner layer of aluminum, and outer layers of tin, and in which the layers are permanently united, without the different metals in the adjoining layers being alloyed with each other, to the great detriment of the product, it is essential that the layers be joined by the process I will proceed to set forth. I first produce a slab X of aluminum, which is rolled to a desired thickness. This slab is introduced into a mold and suitably supported therein, for example, in the manner illustrated in Fig. II, in which the slab is shown supported by pins 2 mounted in the walls of the mold 1. These pins, or any substitute therefor, are utilized to so support the slab X that it will be free to contact with the bottom of the mold and the mold walls. The slab having been properly placed in the mold, I next pour molten tin into such mold for the production of the outer layers of my composite metal. This molten tin is sufficient in quantity to inclose the aluminum slab and, when the molten metal becomes cooled, there is present in the mold an ingot comprising an outer incasing body of the tin and an inner core or core body of aluminum.

Cooling of the ingot in the mold is preferably facilitated by circulating water through the water jacket 3. The ingot of metal comprising an aluminum core and outer casing of tin is then taken from the mold and, having been scraped and brushed, is rolled in a rolling mill until the metal has been reduced to a desired thickness, say, about one-fifth of the original thickness of the ingot, the initial rolling operation being one involving severe and rapid pressure by the rolls. When the ingot has been rolled to the degree mentioned, it is in a condition that may be termed "broken down" and, thereafter, the slab that has been produced by the initial rolling may be rolled to any necessary further degree by passing it between the rollers the same as in rolling a slab or sheet composed of only a single layer of metal.

I desire to here state that I am aware efforts have heretofore been made to produce composite metal articles in which tin has been fused to aluminum; but, in so far as I am aware, all of these efforts have involved the carrying out of a method that resulted in the aluminum being alloyed with the metal fused thereto, as distinguished from my composite metal in which the aluminum is so united to the metal as to avoid fusing of the two metals, thus providing for each retaining its original identity and merits. If the elements of a composite metal article such as enter into my composite metal are combined by following the steps heretofore proposed to be followed, the outer metals are deteriorated in nature to such a degree as to render the product of little commercial value as compared with the commercial value of my composite metal article for the use intended.

When a composite metal such as herein described is so produced as to result in an alloy of tin and aluminum, the number of layers of metal are increased by the presence of two layers of alloy at opposite sides of the layer of aluminum. Therefore, inasmuch as an alloy of tin and aluminum is useless in the arts, the product is depreciated in a degree proportionately to the existence of the alloy therein. The presence of such alloy detracts greatly from the utility of the composite metals, for the reason that the metals cannot be properly worked in various operations necessary to manufacturers, such as spinning, drawing and stamping. This is due to the alloys weakening the composite metal and rendering it only of such strength as is indicated by its weakest part, viz., that comprising the alloy.

It is well to add in conclusion that the highly desirable characteristic of my composite metal article, namely: the feature of the aluminum and tin of the metal being unalloyed with each other, is derived by reason of the aluminum being in an unmolten state when the tin is placed therearound in a suitable mold, thereby causing the tin to be chilled by the mold during the molding operation, without opportunity for the alloying of the aluminum with the tin metals. The subsequent operations of rolling the cast ingot result in the unalloyed metals being caused to cohere to each other; consequently, when all of the steps necessary to the production of my metal have been carried out, a metal article is acquired in which the tin and the aluminum core are present in unalloyed condition, and each metal is susceptible of performing its individual function, as contemplated, without detrimental effect thereon by the other metal.

I claim:—

A composite metal, comprising an intermediate layer of aluminum, and outer layers of tin, the layers of tin directly adhering to the layer of aluminum and being unalloyed therewith.

LEWIS B. TEBBETTS, 2D.

In the presence of—
A. J. McCAULEY,
E. B. LINN.